Feb. 13, 1934.   G. W. WALTON   1,947,071

VALVE

Filed Oct. 26, 1931

INVENTOR
George W. Walton.
BY Arthur C. Brown
ATTORNEY

Patented Feb. 13, 1934

1,947,071

UNITED STATES PATENT OFFICE 1,947,071

VALVE

George W. Walton, Dallas, Tex.

Application October 26, 1931. Serial No. 571,102

3 Claims. (Cl. 251—144)

My invention relates to valves, and more particularly to a device of that character especially adapted for use in mud pumps commonly employed in connection with drilling of oil wells, the principal object of the invention being to provide a valve wherein back pressure of fluid in the valve chamber may be utilized for sealing the valve.

In accomplishing this and other objects of my invention, I have provided improved details of structure, the preferred form of which is illustrated in the accompanying drawing, wherein.

Figure 1:
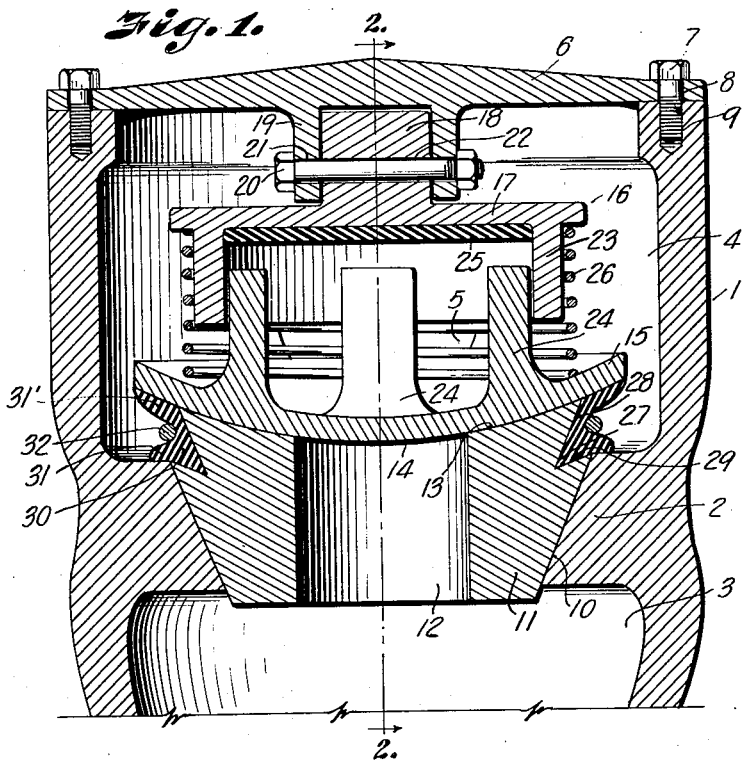
Fig. 1 is a central vertical section of a valve embodying my invention, showing the valve closed.
Figure 2:
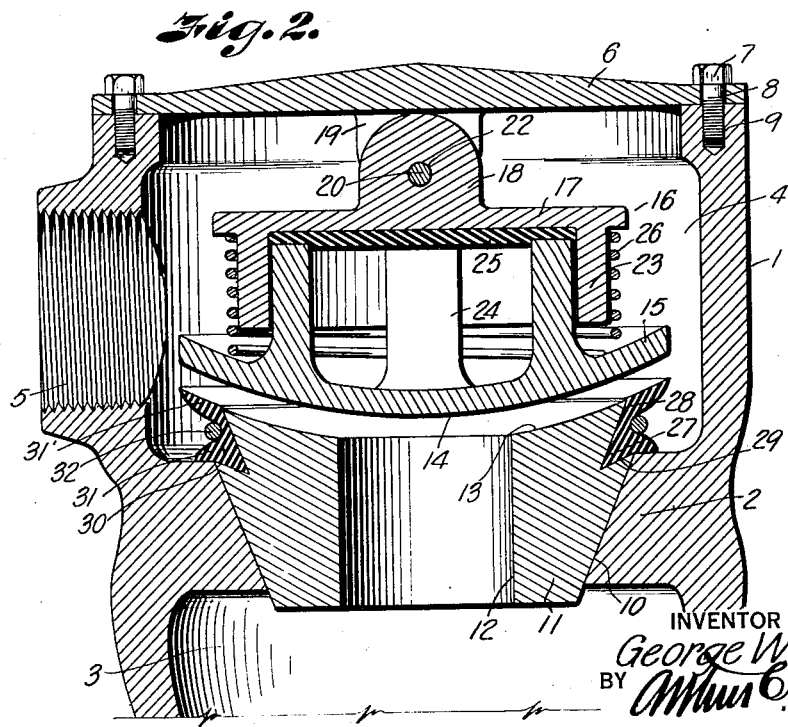
Fig. 2 is a central vertical section on the line 2—2, Fig. 1, showing the valve open.

Referring more in detail to the drawing:

1 designates a cylindrical housing which may form a portion of a mud pump or other device with which the present structure is adapted for use. Within and preferably cast integral with the housing is a partition 2 dividing the interior of the housing into an inner chamber 3 adapted for connection with a source of fluid supply, and an outer chamber 4 having an outlet opening 5.

The chamber 4 is preferably closed at its outer end by a cover plate 6 secured to the housing by cap screws 7 extended through openings 8 in the plate and threaded into aligning openings 9 of the housing.

The partition 2 has a central, conical opening 10 into which is fitted a conical valve seat 11 that projects into the outer chamber and has a central port 12 providing communication between the chambers 3 and 4. The seat 11 has an upper concave face 13 for seating the complementary lower convex face 14 of a valve 15.

Means for insuring accurate alignment of the valve with its seat includes a guide member 16 having a plate 17 provided with a neck 18 which is pivotally mounted between downwardly depending spaced ears 19 of the cover 6 by a bearing bolt 20 extended through aligning openings 21 and 22 in the ears and neck respectively.

The guide member further includes a downwardly extending annular flange 23 inset slightly from the outer periphery of the plate 17 and slidably surrounding a plurality of upstanding lugs 24 formed integrally with the upper surface of the valve.

A compressible disk 25, preferably formed of rubber, is seated in the guide member within the flange and serves as a bumper for the lugs when the valve is in open position.

Normally, the valve is retained in closed condition by a spring 26 surrounding the flange 23 and seated between the lower face of the plate 17 and the upper surface of the valve.

In order to seal the seating member in the partition opening and to insure sealing of the valve, I provide the upper end of the seat member with an annular socket 27 having a wall 28 preferably inclined in parallelism with the outer conical wall of the seat member, and an upwardly-facing inclined bottom wall 29 for retaining a sealing ring 30 of rubber or similar compressible material.

The sealing ring is preferably formed with spaced peripheral lips 31 and 31', adapted respectively to overlie and seal the joint between the seat member and partition, and to seal the joint between the valve and seat member when the valve is closed.

A metal ring 32, surrounding the ring 30 within the groove formed between the lips 31—31', serves to retain the ring 30 in its seat, and pressure of fluid passing through the upper chamber will force the lips against their respective joints to effect the sealing actions of the lips.

It will be obvious that various means may be employed for joining the band after it is mounted on the sealing ring, or that it may be formed as a unitary band before being sleeved over the ring, and that both ring and band may be then forced over the reduced extension.

Assuming a valve to be constructed and assembled as described, the action thereof would be as follows:

When fluid is pumped from the lower into the upper chamber through the port 12, the valve is raised from its seat against the tension of the spring 26 and is guided by the flange 23.

After each intake stroke of the pump, the valve is returned to its seat by the spring, and the fluid pressure in the upper chamber urges the lips of the sealing ring outwardly into firm engagement with the upper face of the partition and the lower face of the valve.

It will be apparent that with the concave upper surface of the seat member and the convex lower surface of the valve curved on the same radius, slight inaccuracy in alignment of the valve with its seat member will not prevent a positive seating engagement and effective sealing relation of the valve with its seat.

What I claim and desire to secure by Letters Patent is:

1. A valve including a housing having a partition dividing the interior of the housing into inner and outer chambers and having a through opening, a ring fitted to the partition opening and extending into the outer chamber having a valve seat on its outer end and having a groove in its extension shaped to form an outwardly diverging side wall, a packing ring in said groove having an inner lip overlying the joint between the seat ring and partition and an outer lip forming an extension of the valve seat, and a valve in the outer chamber yieldingly urged to said seat, the lips of the packing ring being responsive to fluid pressure in the outer chamber to seal the joints between the seat ring and the partition and between the valve and its seat.

2. A valve including a housing having a partition dividing the interior of the housing into inner and outer chambers and having a through opening, a ring fitted to the partition opening and extending into the outer chamber having a valve seat on its outer end and having a groove in its extension shaped to form an outwardly diverging side wall, and an upwardly inclined base wall, the latter coextensive with the outer face of the partition, a packing ring in said groove having an inner lip overlying the joint between the seat ring and partition and an outer lip forming an extension of the valve seat, and a valve in the outer chamber yieldingly urged to said seat, the lips of the packing ring being responsive to fluid pressure in the outer chamber to seal the joints between the seat ring and the partition and between the valve and its seat.

3. A valve including a housing having a transverse interior partition provided with an opening, a ring in said opening having a valve port and an annular seat at its outer end about the port, a packing ring surrounding the outer end of the valve ring having an inner lip overlying the joint between the valve ring and the partition and an outer lip forming an extension of the valve seat, a valve yieldingly urged to said seat, the lips of the packing ring being responsive to fluid pressure to seal the joints between the valve ring and the partition and between the valve and the seat ring, and a retaining ring in the groove formed by the lips of the packing ring.

GEORGE W. WALTON.